(12) United States Patent
Legrand et al.

(10) Patent No.: US 9,109,557 B2
(45) Date of Patent: Aug. 18, 2015

(54) CONNECTOR ARRANGEMENT FOR A FLUID SYSTEM

(75) Inventors: Philippe Legrand, St. Gervais la Foret (FR); Pascal Hausmann, Vineuil (FR)

(73) Assignee: Delphi International Operations Luxembourg S.A.R.L., Luxembourg (LU)

(*) Notice: Subject to any disclaimer, the term of this patent is extended or adjusted under 35 U.S.C. 154(b) by 667 days.

(21) Appl. No.: 13/264,794

(22) PCT Filed: Mar. 11, 2010

(86) PCT No.: PCT/EP2010/053137
§ 371 (c)(1),
(2), (4) Date: Nov. 4, 2011

(87) PCT Pub. No.: WO2010/118922
PCT Pub. Date: Oct. 21, 2010

(65) Prior Publication Data
US 2012/0038142 A1  Feb. 16, 2012

(30) Foreign Application Priority Data

Apr. 17, 2009  (EP) ..................................... 09158131

(51) Int. Cl.
*F16L 19/028* (2006.01)
*F02M 55/00* (2006.01)

(52) U.S. Cl.
CPC ............ *F02M 55/002* (2013.01); *F02M 55/004* (2013.01); *F02M 55/005* (2013.01); *F16L 19/028* (2013.01); *F16L 19/0283* (2013.01)

(58) Field of Classification Search
CPC . F16L 19/028; F16L 19/0283; F02M 55/002; F02M 55/005; F02M 55/004

USPC ........... 285/13, 106, 354, 386; 123/467, 468; 60/455

See application file for complete search history.

(56) References Cited

U.S. PATENT DOCUMENTS

| 3,489,435 | A  | * | 1/1970 | Olson et al. ..................... 285/13 |
| 4,185,462 | A  | * | 1/1980 | Morse et al. .................... 60/761 |
| 5,094,480 | A  |   | 3/1992 | Boileau |
| 6,279,540 | B1 | * | 8/2001 | Greaney et al. ............... 123/470 |
| 6,431,608 | B1 | * | 8/2002 | Kato ................................ 285/13 |
| 8,177,261 | B2 | * | 5/2012 | Guerineau ...................... 285/13 |

FOREIGN PATENT DOCUMENTS

| CH | 321 263 |      | 4/1957 |             |
| EP | 0 387 504 |    | 9/1990 |             |
| EP | 0 432 013 |    | 6/1991 |             |
| EP | 2017463 A2 | * | 1/2009 | ............ F02M 55/00 |
| FR | 2 869 367 |    | 10/2005 |            |
| FR | 2 869 652 |    | 11/2005 |            |

* cited by examiner

*Primary Examiner* — Daniel P Stodola
*Assistant Examiner* — James Linford
(74) *Attorney, Agent, or Firm* — Thomas N. Twomey

(57) ABSTRACT

A connector arrangement for a fluid system includes a fuel injector that defines a first fluid passage having a connector, a pipe that is engageable with the connector of the first fluid passage, preferably to form a high pressure seal, and a nut arranged to connect the pipe to the connector of the first fluid passage. A chamber is defined between the nut and the fuel injector, such chamber serving to collect leaked fluid from the first fluid passage. The fuel injector is provided with a second fluid passage having a first end in communication with the chamber and a second end in communication with a low pressure drain such that leaked fuel is provided with a drain path.

4 Claims, 2 Drawing Sheets

CONNECTOR ARRANGEMENT FOR A FLUID SYSTEM

TECHNICAL FIELD

The invention relates to a connector arrangement for use in a high pressure fluid system. The invention has particular utility in the field of automotive fuel injection systems in which pipe work for carrying pressurised fluid, for example fuel, is required to be connected to one or more fuel injectors.

BACKGROUND OF THE INVENTION

Modern compression-ignition internal combustion engines (hereinafter 'diesel' engines) include one or more fuel injectors which are arranged to deliver a shot of fuel at very high pressure into an associated combustion cylinder of the engine. Typically, fuel is distributed to the fuel injectors of the engine from a source of high pressure fuel (for example a high pressure fuel accumulator volume, or 'common rail') through a network of high pressure pipes.

FIGS. 1 and 1A show a known arrangement and an enlarged portion thereof respectively in which an injector 2 is supplied with high pressure fuel by a high pressure pipe 4 which defines a fluid passage 5. The injector 2 takes the general form of an elongate injector body 6 which defines a fuel injection nozzle 8 at one end, the lower end as shown in FIG. 1, and a fuel inlet 10 at the end remote from the fuel injection nozzle 8.

The fuel inlet 10 is a projection 12, or stub, that extends at right angles from the longitudinal axis 'A' of the fuel injector body 6. The projection 12 defines a fuel inlet passage 14 that opens up to define a socket 16 having a frustoconical sealing surface.

The socket 16 provides a sealing surface for engaging with a rounded end 18 of the high pressure pipe 4. The rounded end 18, or 'olive', of the high pressure pipe 4 defines an annular contact ring 22 at which the high pressure pipe 4 engages the socket 16 thus establishing a high pressure seal.

The pipe 4 is biased into engagement with the socket 16 by way of a pipe nut 24. The nut 24 defines a central aperture 26 through which the pipe 4 is received so that the nut 24 is slidable over the pipe 4. The nut 24 carries an internal thread 30 that is engageable with a cooperable thread 32 provided on the outwardly facing surface of the projection 12.

The nut 24 is retained on the pipe 4 by way of the rounded pipe end 18, which has a diameter larger than the diameter of the nut aperture 26. The nut 24 is screw threadedly engageable with the projection 12 by which means the rounded pipe end 18 is forced into engagement with the socket 16 to establish a seal.

A problem exists in the above arrangement in that the effectiveness of the seal may be compromised. For example, the contact ring 22 between the pipe end 18 and the socket 16 may be damaged during handling of the injector 2 and/or the high pressure pipe 4 during engine manufacture or assembly. Similarly, damage to the contact ring 22 may also occur during a maintenance event.

In such circumstances, it is possible for fuel to leak past the contact ring 22 into a chamber 23 defined between the end of the projection 12 and the inside of the nut 24 and also past the threaded engagement of the projection 12 and nut 24, as is shown by the arrows labelled '13'. If the injector is installed in such a manner that the inlet end 10 of the injector 2 is housed within a cam cover of an engine, then there exists the potential of engine oil becoming contaminated by fuel leading to severe engine damage.

Alternatively, if the fuel injector inlet end 10 is located outside the confines of the cam cover, fuel may drip onto the engine which presents a waste of fuel and generates odour.

SUMMARY OF THE INVENTION

It is in pursuit of a solution to the above problems that the invention provides a connector arrangement for a fluid system, comprising a component defining a first fluid passage having a connector (which may be a fuel inlet or an outlet), a pipe for carrying high pressure fluid that is engageable with the connector of the first fluid passage to form a seal, connecting means arranged to connect the pipe to the connector of the first fluid passage, wherein a chamber is defined between the biasing means and the component. The first component is provided with a second fluid passage having a first end in communication with the chamber and a second end in communication with a low pressure drain. As a result, fuel that leaks from the first fluid passage to the chamber is provided with a fluid path to drain.

The invention has particular utility in the field of fuel injection systems where high pressure connections can give rise to fuel leakages that have to be managed appropriately in order to avoid possible cross-contamination of fluids, engine damage or other harmful consequences. In this respect, the first component may be a fuel injector, or may also be another component such as a fuel pump or a high pressure common rail, for example.

The connecting means may be an annular member or 'nut' that is securable to the first component by way of a screw thread engagement. This provides a convenient way of securing the two components. However, it should be appreciated that the connecting means may be secured in other ways, for example by spring clips or by way of a press fit. In one embodiment, the nut is provided with an aperture through which the pipe is received so that it can engage with the inlet.

The nut may be cup-shaped so as to define a side wall carrying an internal screw thread which is engageable with a complementary screw thread provided on the inlet of the first component to secure the nut thereon. In order to prevent leakage through the aperture, the pipe may be shaped to engage the aperture to create a seal.

The invention provides guards against potential leakages that could occur at the link between the injectors and high pressure pipe work since any leaked fuel is routed away from critical areas and into a backleak passage provided in the injector, the backleak passage serving to convey leaked fuel from clearances and valve arrangements within the injector to a low pressure drain. Therefore, the risk of severe engine damage by contaminated oil is avoided.

BRIEF DESCRIPTION OF THE DRAWINGS

Reference has already been made to FIGS. 1 and 1A which show a part-sectioned view of a fuel injector incorporating a known high pressure connector arrangement. In order for the invention to be better understood, it will now be described with reference to FIG. 2 which shows a part-sectioned view of a fuel injector incorporating a high pressure connector arrangement in accordance with the invention and to FIG. 2A which shows an enlarged portion of FIG. 2.

DETAILED DESCRIPTION OF THE EMBODIMENTS

Figures 1, 1A:
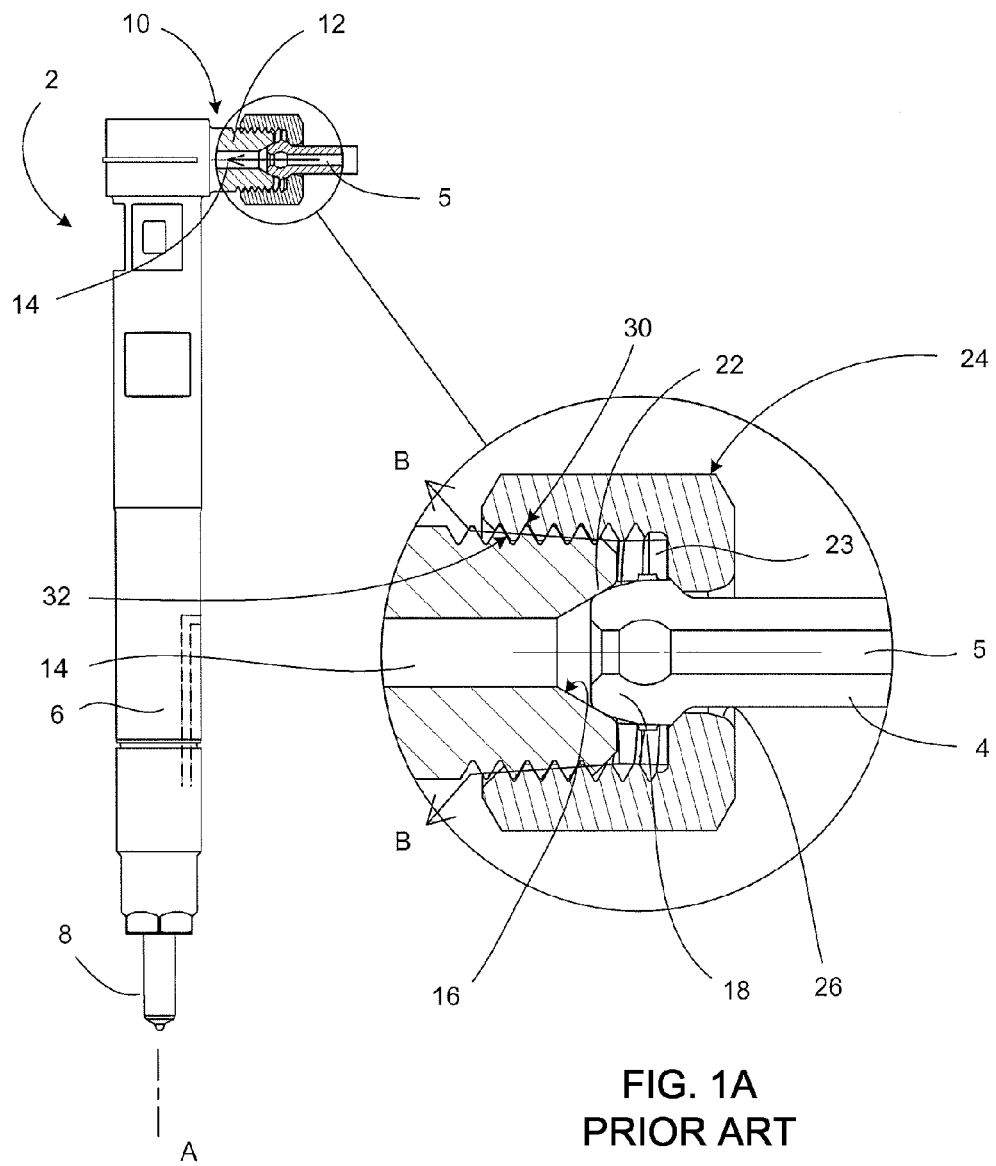
Figures 2, 2A:
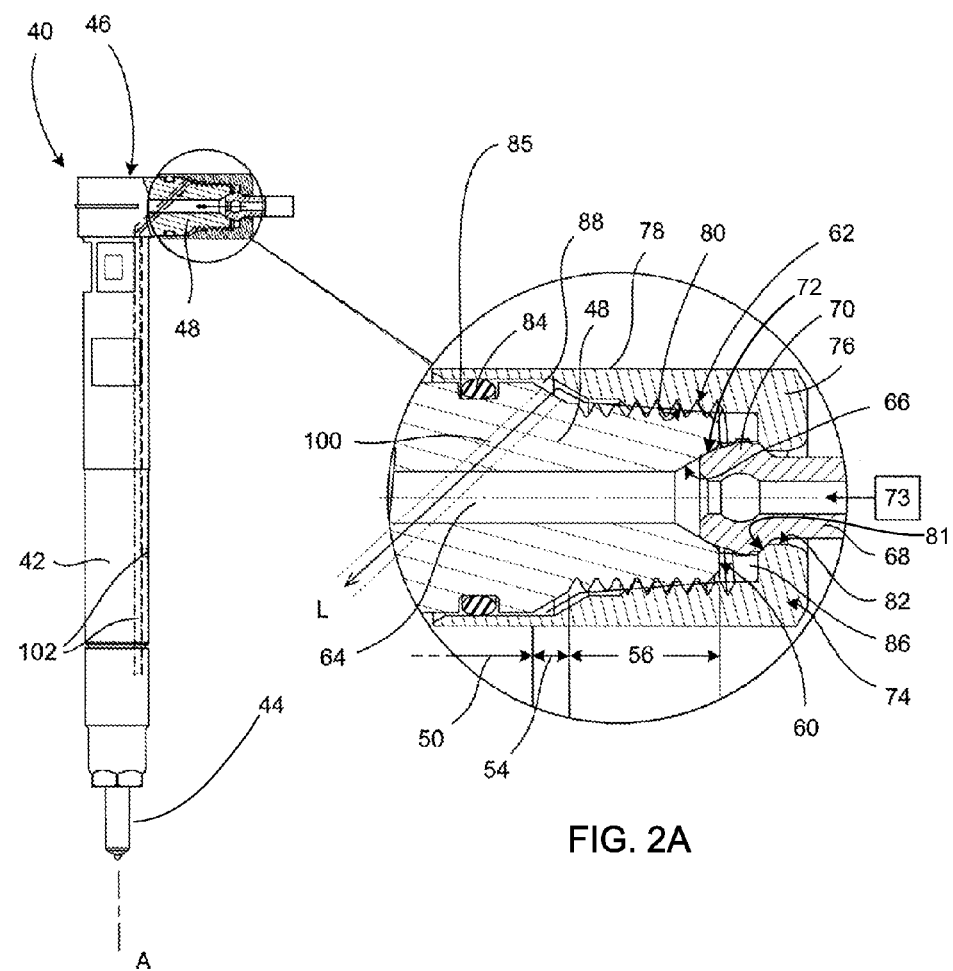

Referring to FIGS. 2 and 2A, a fuel injector 40 is shown in general outline and includes an elongate injector body 42 that is generally cylindrical in form. The injector body 42 includes a fuel injection nozzle 44 at its lower end (in the orientation shown in FIG. 2) and, at its upper end, the injector body 42 includes a fuel connector or 'inlet' 46 in the form of a transverse projection 48 that extends at right angles to the longitudinal axis 'A' of the injector body 42.

The projection 48 has a stepped outer profile and as such includes a first region 50 which is generally cylindrical and extends a short way from the injector body 42 before tapering sharply to define a transition region 54. A second region 56 extends from the transition region 54 and defines a flat end face 60 of the projection 48. The second region 56 defines an external screw thread 62 on its outer surface.

The fuel inlet 46 further includes a fuel inlet passage 64 defined by a cross drilling that extends perpendicular to the longitudinal axis A of the injector body 42. The fuel inlet passage 64 opens at the end face 60 of the projection 48 and defines a conical seating surface or 'socket' 66 for mating with a complementary shaped high pressure fuel pipe 68.

The fuel inlet passage 64 extends radially inwards from the socket 66 into the injector body 42 and turns through a right-angled corner (not shown in FIG. 2) and extends down through the injector body to supply the fuel injection nozzle 44 with high pressure fuel, in use.

Although not shown in FIG. 2, the fuel injector houses an electromagnetic valve arrangement which controls delivery of fuel from the fuel injection nozzle 44 in a manner which is known in the art. It should be appreciated that the precise internal configuration of the injector body 42 is not central to the inventive concept and will not be described here in detail.

The high pressure fuel pipe 68 (hereinafter 'pipe') includes a rounded end 70 that engages the socket 66 to define an annular contact ring 72, thereby establishing a high pressure seal, in use. The pipe 68 serves to carry pressurised fuel from a source 73, for example a high pressure accumulator volume, which is also known in the art as a 'common rail'. A mid-section of the rounded end 70 defines an annular ridge.

The pipe 68 is biased into engagement with the socket 66 and, thus, connected thereto by way of connecting means in the form of a nut 74. The nut 74 is generally cup-shaped having a base 76 that opposes the flat end face 60 of the projection 48 and a tubular wall 78 depending from the base 76. The tubular wall 78 extends over the projection 48 and defines an inner profile that largely corresponds to the stepped outer profile of the projection 48. A region of the tubular wall 78 adjacent the base 76 defines a thread 80 to engage with the outer thread 62 of the second region 56 of the projection 48.

The base 76 of the connecting nut 74 defines a central aperture 82 through which the pipe 68 is received so that the nut 74 is slidable over the pipe 68. The rounded end 70 of the pipe 68 has a outer dimension larger than the aperture diameter of the nut 74 so that the pipe 68 cannot pull through the nut 74. Thus, as the nut 74 is screwed onto the projection 48, the inner edge of the aperture 82 bears against the rounded end 70 of the pipe 68 at a second contact ring 81 and presses it into engagement with the socket 66 thereby establishing a seal. Since the inner edge of the aperture 82 defines a seal against the rounded end 70 of the pipe 68 leakage of fuel through the aperture 82 is prevented.

An O-ring 84 is provided in a groove 85 provided on the projection 48 adjacent the open end of the tubular wall 78 in order to create a seal between the tubular wall 78 and the cylindrical region 50 of the projection 48.

It should be noted for the purposes of this description that the projection 48, the pipe 68 and the nut 74 may be considered collectively to provide a connector arrangement of the fuel injector 40.

In use, it is possible that high pressure fuel carried between the pipe 68 and the high pressure passage 64 will leak past the contact ring 72 between the rounded end 70 of the pipe 68 and the socket 66. In order to manage this leakage, the nut 74 is shaped so as to define a first annular chamber 86 between it, the rounded end 70 of the pipe 68 and the end face 60 of the projection 48. Any fuel that leaks past the contact ring 72 therefore collects in the first annular chamber 86.

From the first annular chamber 86, fuel is able to leak past the screw thread 62; 80 and into a second annular chamber 88 defined between the tubular wall 78 of the nut 74 and the transition region 54 of the projection 48. However, it should be noted that fuel is contained within the chamber 88 by the O-ring 84.

The injector body 42 is also provided with a drilling 100 (shown in dashed lines in FIG. 2) that defines an opening at the transition region 54 (i.e. in the chamber 88) of the projection 48 and extends into the injector body 42 at an oblique angle to the injector body axis A.

The drilling 100 is configured to be in fluid communication with a backleak passage 102 within the fuel injector body 42. Thus, fuel that leaks past the socket 66 into the annular chamber 86 is provided with a defined leakage path past the screw thread 62; 80 into the second annular chamber 88 and through the drilling 100 to the backleak passage 102, as indicated by the arrow 'L'. Beneficially, therefore, leaked fuel is provide a path back to a low pressure fuel source, the vehicle's fuel tank for example, rather than simply being leaked from the high pressure connection to present a potential engine oil contamination or fuel leakage hazard within the engine bay of the vehicle.

It should be appreciated that since the connector arrangement and leakage channels are integrated into the fuel injector 40, the overall size of the fuel injector 2 is not increased, thereby avoiding packaging problems. This is particularly important on modern engines which are designed to be smaller and lighter, therefore with less space to house fuel injection equipment.

The skilled person will appreciate that various modifications to the embodiments described above are possible without departing from the inventive concept as defined by the claims. For example, although the connector arrangement has been described above with specific reference to a fuel injector, the invention is applicable also to other components of an engine where high pressure fuel is supplied to, or from, said components through high pressure pipe work. For example, a high pressure fuel pump and a common rail accumulator volume are components that would benefit from a connector arrangement as provided by the invention.

The invention claimed is:

1. A connector arrangement for fluid system, comprising:
   a fuel injector having an elongate injector body and a fuel inlet connector in the form of a projection and the fuel inlet connector has a first fluid passage extending there through, wherein a screw thread is carried on the projection;
   a pipe that is engageable with the fuel inlet connector; and
   an annular member arranged to connect the pipe to the fuel inlet connector, wherein the annular member is connectable to the fuel injector and has an aperture through which the pipe is received and wherein the annular member has a base and a longitudinal side wall defining an inner surface carrying a screw thread;
   wherein a first chamber is defined by the annular member, the fuel inlet connector and the pipe, the first chamber collects fuel that leaks a contact region between the fuel inlet connector and the pipe;

wherein the projection includes a first region which extends from the injector body before tapering to define a transition region, and a second region which extends from the transition region; and wherein a second annular chamber is defined by the longitudinal side wall of the annular member and the transition region of the projection, wherein the fuel injector is provided with a second fluid passage having a first end in fluid communication with the second annular chamber and a second end in fluid communication with a backleak passage connected to a drain in the fuel injector, the backleak passage of the fuel injector serving to convey leaked fuel from the fuel injector to a drain, so that fuel that leaks from the first fluid passage, past a contact interface formed at the contact region, to the first chamber, between the screw threads, and to the second annular chamber is provided with a fluid path to drain via the backleak passage of the fuel injector.

2. The connector arrangement of claim 1, wherein the annular member is engageable with a complementary screw thread provided on an external surface of the fuel injector.

3. The connector arrangement of claim 2, wherein the pipe is shaped so as to create a seal with the aperture provided in the annular member.

4. The connector arrangement of claim 1, wherein the pipe is shaped so as to create a seal with the aperture provided in the annular member.

* * * * *